US006522866B1

(12) United States Patent
Merkle et al.

(10) Patent No.: US 6,522,866 B1
(45) Date of Patent: Feb. 18, 2003

(54) ALTERNATIVE FREQUENCY SERVICE VERIFICATION

(75) Inventors: Carsten Merkle, Welzheim (DE); Jens Wildhagen, Weinstadt (DE); Markus Zumkeller, Schwaikheim (DE)

(73) Assignee: Sony International (Europe) GmbH, Berlin (DE)

( * ) Notice: Subject to any disclaimer, the term of this patent is extended or adjusted under 35 U.S.C. 154(b) by 340 days.

(21) Appl. No.: 09/608,387

(22) Filed: Jun. 30, 2000

(30) Foreign Application Priority Data

Jul. 5, 1999 (EP) ........................................... 99112969

(51) Int. Cl.[7] ................................................ H04B 7/00
(52) U.S. Cl. ....................... 455/59; 455/277.1; 375/343
(58) Field of Search ................................ 455/59, 277.1, 455/277.2; 375/343

(56) References Cited

U.S. PATENT DOCUMENTS

| | | | | | |
|---|---|---|---|---|---|
| 5,225,902 | A | * | 7/1993 | McMullan, Jr. | 455/59 |
| 5,471,662 | A | | 11/1995 | Shiota | 455/166.1 |
| 5,659,883 | A | * | 8/1997 | Walker et al. | 455/59 |
| 6,131,016 | A | * | 10/2000 | Greenstein et al. | 455/562 |
| 6,195,534 | B1 | * | 2/2001 | Sakoda et al. | 375/260 |

FOREIGN PATENT DOCUMENTS

| | | | | |
|---|---|---|---|---|
| DE | 1050984 A1 * | 8/2000 | | H04H/1/00 |
| EP | 0 822 677 | 2/1998 | | |
| EP | 0 994 586 | 4/2000 | | |

OTHER PUBLICATIONS

Senger P: "DRM–Digital Radio Mondiale Ein Weltweites Konsortium Fuer Einen Neuen Digitalen Standard" vol. 43, No. 1, p. 29/35, XP000824065.

* cited by examiner

*Primary Examiner*—Thanh Cong Le
*Assistant Examiner*—Lana Le
(74) *Attorney, Agent, or Firm*—Frommer Lawrence & Haug LLP; William S. Frommer; Dennis M. Smid

(57) ABSTRACT

An alternative frequency of e. g. a digital shortwave signal like a DRM signal can easily and satisfactorily be checked whether or not the same service is transmitted before a fast seamless switching to this alternative frequency can be performed. The inventive method to perform such a checking is characterized by a respective correlation of at least two sets of samples taken from the signal transmitted on the alternative frequency having a predetermined time relationship ($\Delta t_{corr}$) and a comparison of said respective correlation results, i.e. comparison of the time ($t_1$) of occurance of a correlation peak included in a first correlation result with the time ($t_2$) of occurance of a correlation peak included in a respective further correlation result, to verify that both services are the same when the time relationship ($|t_{2\ 1\ -t1}|$) between said correlation peaks is the same as said predetermined time relationship ($\Delta t_{corr}$) of the at least two sets of samples.

5 Claims, 5 Drawing Sheets

ALTERNATIVE FREQUENCY SERVICE VERIFICATION

BACKGROUND OF THE INVENTION

The invention relates to a method to verify that a service transmitted on an alternative frequency is the same as a service transmitted on said currently received frequency. In particular to such a verification for the purpose to perform a seamless switching from a first currently tuned frequency to a second alternative frequency (AF).

In broadcast systems that deliver the same services in adjacent or overlapping areas on different frequencies, it is needed to find a proper criteria to switch to an alternative frequency without loosing the service, i. e. to perform a seamless switching.

In public information service systems like DAB or DVB-T techniques for switching to alternative frequency are used, but they provide no disturbance-free switching from one frequency to another. In the EP-A-98 119 400 a method and data frame structure for the digital transmission of information is suggested in which the transmission system is defined such that the receiver is able to test an alternative frequency without loosing any relevant information on the current tuned frequency, because the signal in the air consists of two parts, namely a continuous data-channel like audio with interleaving in time, but not repeated, and a static data channel including information about the service, multiplex configuration, program time, transmitter ID, service ID and alternative frequency list. In this system the receiver has the time to check alternative frequencies without loosing relevant information data during the static data-channel.

However, this transmission system underlies the condition that the static data-channel is identical and unique for all services at all times, i. e. the same static data-channel is transmitted by all transmitters belonging to a service without any changes at any time. For a certain radio transmission systems, e. g. DRM (Digital Radio Mondial), no such reliable static data-channel is provided and therefore it cannot be secured that in such radio transmission systems a seamless switching will be performed in any instance.

Therefore, the EP-A-99 109 102 provides a method to perform a seamless switching from a first currently tuned frequency to a second alternative frequency with the step of receiving at least one set of samples from a respective signal transmitted on at least one second frequency during a time period during which an indicator assures that it is secure that only data that has been transmitted at least once is transmitted as signal on said first frequency. Such a radio transmission signal consists of a quasi-static data-channel (SD), a dynamic data-channel (DD) and a gap-channel (GAP). The signal is then formed of consecutive frames each of which consists of a gap part, a quasi-static data part and a dynamic data part. In this case, a respective indicator within a respective dynamic data part about the quasi-static data part relates also to a forthcoming gap part transmitted in the same signal frame as the symbol(s) of the quasi-static data part the respective indicator relates to.

The checking itself whether the signal transmitted on the alternative frequency is the same as the signal on the currently received frequency, wherein one of the signals can have a time delay, is performed with the help of a correlation of a reference signal generated on basis of the signal received on the currently tuned frequency with a signal probe, i. e. a set of samples, of the signal received on the alternative frequency. Especially, when the set of samples consists only a small number of samples there might be the probability that the AF transmits an other service even if a correlation peak occurs.

OBJECTS AND SUMMARY OF THE INVENTION

Therefore, it is the object of the present invention to provide a verification method that a signal transmitted on the alternative frequency is the same as the signal transmitted on said currently received frequency, i.e. that both frequencies transmit the same service.

This object is solved by a method according to independent claim 1, preferred embodiments thereof are defined in the respective subclaims.

The present invention provides a method to verify that a service transmitted on an alternative frequency to a currently received frequency is the same as a service transmitted on the currently received frequency, wherein a first correlation result of a first set of samples taken from a signal representing the service transmitted in the alternative frequency at a first point of time with a reference signal indicates whether or not both signals are the same The method comprises the steps of calculating a respective further correlation result of at least one father set of samples taken from the signal transmitted on the alternative frequency at a further point of time that has a respective predetermined time relationship ($\Delta t_{corr}$) to the first point of time with the reference signal, and comparing the first correlation result with the respective further correlation result, wherein the comparing result verifies whether or not both services are the same.

DESCRIPTION OF THE DRAWINGS

The invention and the underlying concept will be described in the following with reference to the accompanying drawings, in which.

DETAILED DESCRIPTION OF THE PREFERRED EMBODIMENT

Figure 2:
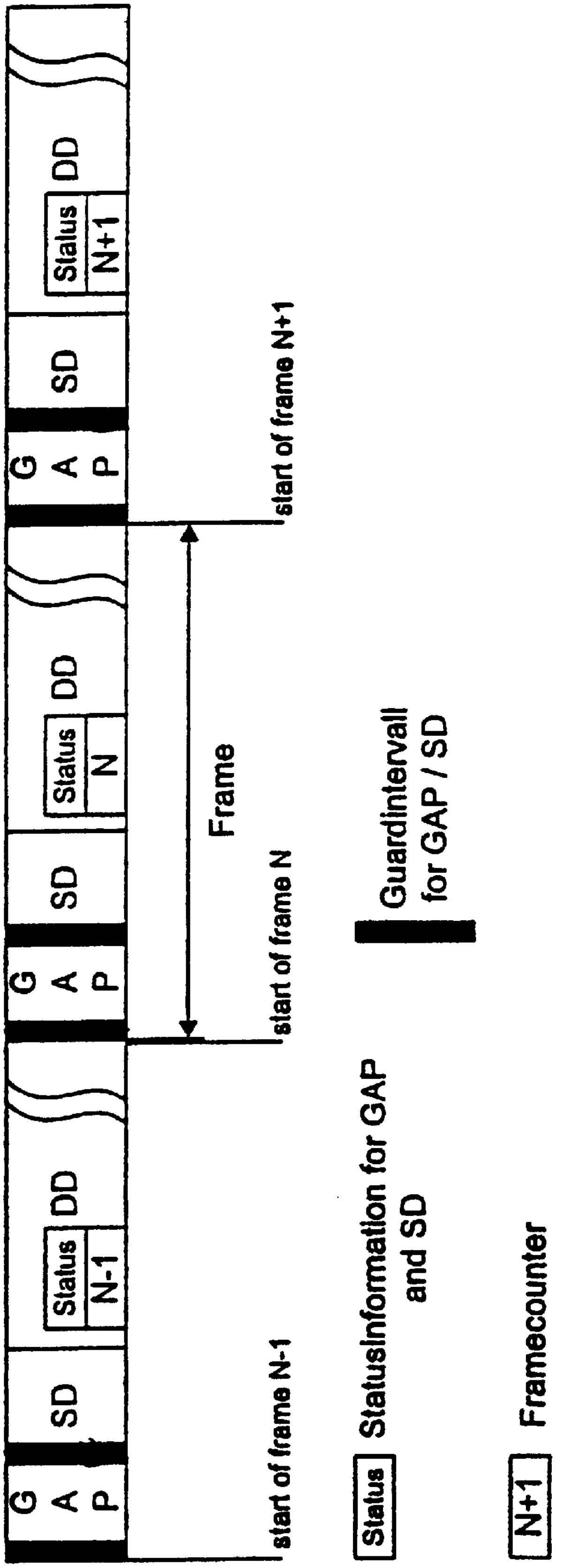
FIG. 2 depicts the principle frame structure and partly the preferred contents of information units of a transmission signal applicable for the present invention.

A digital transmission system embodying the invention might have a fame structure as disclosed in the EP-A-99 109 102 which is herewith incorporated by reference, as it is shown in FIG. 2. The signal in the air generally consists of two parts, i.e.

a dynamic data-channel DD) like an audio-channel with interleaving in time, but not repeated, and a quasi-static data-channel (SD), e.g. comprising the information about the respective service, i.e. multiplex location, program type, alternative frequency list, transmitter ID and as the case may be additional service information.

Additionally, a gap might be located within a frame, as also shown in FIG. 2, which could have a variable length depending on the transmission frequency and therefore on the possible delay between the alternative frequencies. For OFDM systems the variable length of the gap might be realized by reducing the total amount of carriers. This gap can either be empty or information transmitted within the quasi-static data-channel can be shifted to the gap.

The quasi-static data-channel and/or the gap might comprise a guard interval.

According to the EP-A-99 109 102, the respective dynamic parts of the dynamic data-channel comprise status information for the respective corresponding quasi-static data parts of the quasi-static data-channel or the quasi-static data-channel and the gap. This status information might show the frame number of the following frame in which the quasi-static data part and if applicable the gap part comprise the identical symbols as the quasi-static data part and if applicable the gap part of the frame comprising the status information. In an advantageous embodiment the dynamic data-channel carries also a frame counter in every dynamic data part indicating the respective frame number.

Figure 1:
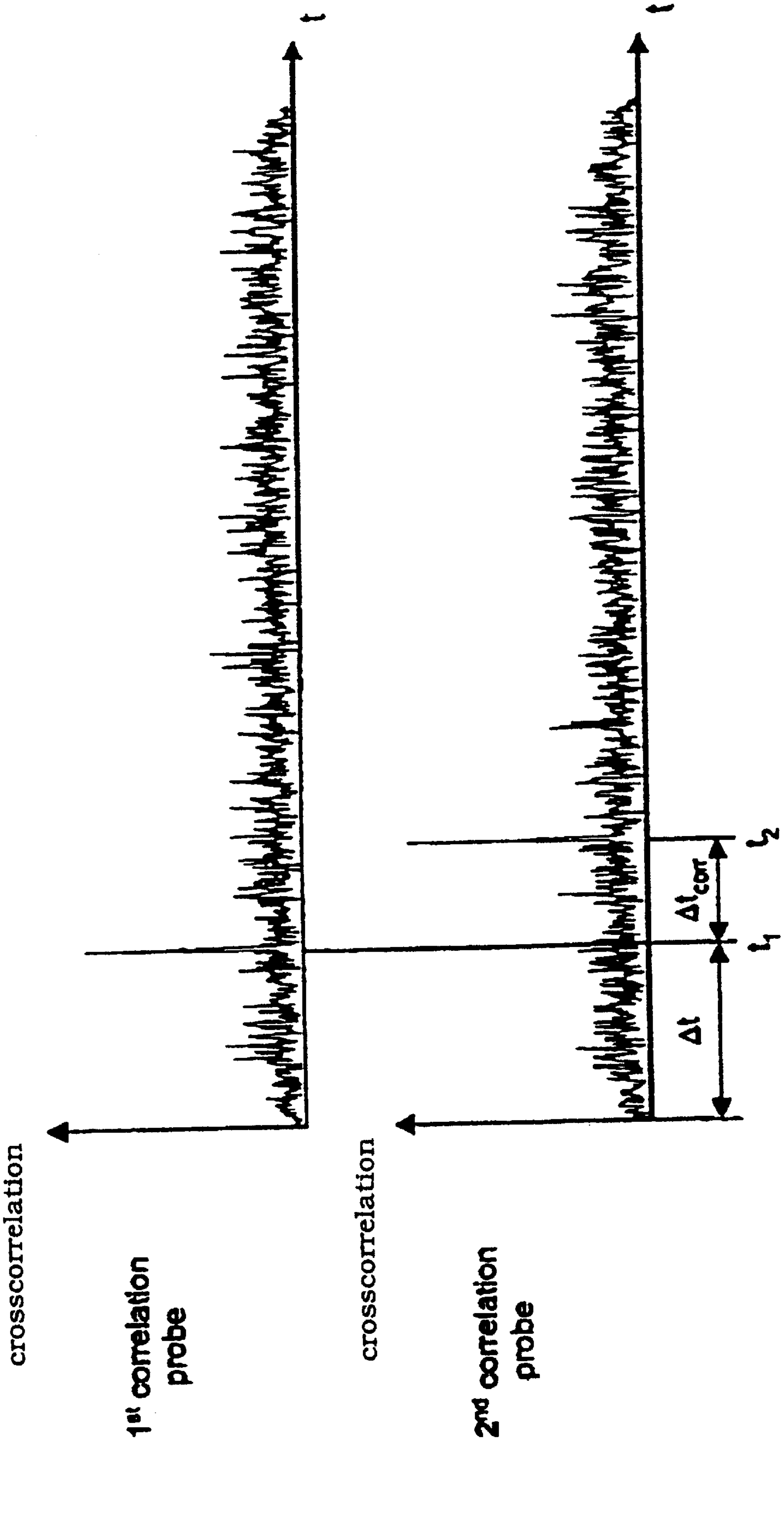
FIG. 1 shows the correlation results of two probes of the signal transmitted on an alternative frequency with a reference signal generated within the receiver according to the present invention.

For the following description the assumption is made that a frame consists of a gap part GAP, a quasi-static data part SD comprising one symbol and a dynamic data part DD as shown in FIG. 1. Of course, the order of SD and GAP can be changed. Further on, the status information should be valid for the symbols included within the static data part and within the gap part. Both, the gap part and the quasi-static data part comprise a guardinterval.

The quasi-static data part should preferably satisfy the following rules:

- The quasi-static data should be in general identical and unique for all services, reference carriers are allowed,
- data included in the gap should be in general identical and unique for all services,
- the quasi-static data provides a frequency synchronization possibility that must not necessarily be a phase reference symbol like transmitted in DAB,
- the frame counter and status information have to be outside the static data part and gap part.

As mentioned above, the repetitive part of the signal is the GAP and SD. On all frequencies of the same service the GAP and the SD are in general the same and unique for this service, i. e. no other service has the same GAP and SD. This might be supported by a specific scrambling of data.

During the time the repetitive part at the current frequency occurs, i. e. the status information for GAP and SD of an earlier frame indicated that the GAP and SD of the current frame has already been transmitted at least once, the receiver can check an alternative frequency.

According to the present invention at least two sets of samples, e. g. two spots of several samples, are taken from the alternative frequency as signal probes and will each be correlated with a reference signal within the receiver to gather some information about the alternative frequency. This reference signal might be simply a copy of a previously received GAP and SD in the time domain or can also be a rebuilt signal that is gathered from the information of one or more previously received GAPs and SDs.

On basis of the correlation peak(s) the receiver can decide if the alternative frequency comprises the same service and in addition the time synchronization can be calculated. Since two spots of several samples are correlated, additionally a frequency synchronization, i. e. an estimation of $\Delta f$ in-between the current frequency or nominal frequency and the alternative frequency can also be calculated.

At the next repetitive part the receiver is then able to switch to the alternative frequency before the SD-symbol occurs on the alternative frequency to use the - known - SD symbol as a phase reference for coherent demodulation, because all carriers are known when switching to the alternative frequency.

FIG. 1 shows the respective correlation of two sets of samples with the reference signal stored within the receiver according to the present invention. It can clearly be seen that one correlation peak occurs in each of the correlation signals.

In case the AF-signal is the same as the reference signal which is based on the currently received signal, a correlation peak occurs. Since the correlation peak occurs only if the AF-signal is the same as the currently received signal it indicates that the AF-signal is the same as the currently received signal.

However, as mentioned above, since the sets of samples of the alternative frequency to perform the correlation with should be not too long so that a good estimation of $\Delta f$ in-between the current frequency and the alternative frequency is possible, there might be the possibility that the AF transmits another service even if a correlation peak occurs.

Therefore, according to the present invention, two correlations are performed with two sets of samples. In the shown case one correlation peak is included within each of the correlation signals, the first correlation signal has a correlation peak indicating a time $t_1$, and the second correlation signal has a correlation peak indicating a time $t_2$, therefore the signals of both sets of samples should be included within the reference signal. To validate this, it is checked whether the time difference $|t_2-t_1|$ of said both correlation peaks equals to the time difference $\Delta t_{corr}$ in-between the reception of said both signal probes. The points of time $t_1$ and $t_2$ are measured relative to a set point of time. For example, the first point of time $t_1$ can show the time difference $\Delta t$ in-between the signals transmitted on both frequencies.

The correlation of the reference signal and the at least two sets of samples of the AF-signal is performed in the time domain. As mentioned above, the reference signal can either be the time domain signal of the GAP and SD of an earlier frame carrying the same symbols as the frame within the testing is performed or can be re-calculated in the receiver on basis of the information of one or more previous GAPs and SDs.

Such a re-calculation is especially preferred in case the services are differently coded, i. e. the service transmitted on the alternative frequency is the same service as transmitted on the currently tuned frequency, but is coded different thereto, i. e. results in a different signal. In this case, two different signals will be compared, but the correlation technique can be performed, since the reference signal will be generated on basis of the information of the signal on the currently tuned frequency, but corresponding to the signal on the alternative frequency.

Figure 3A:
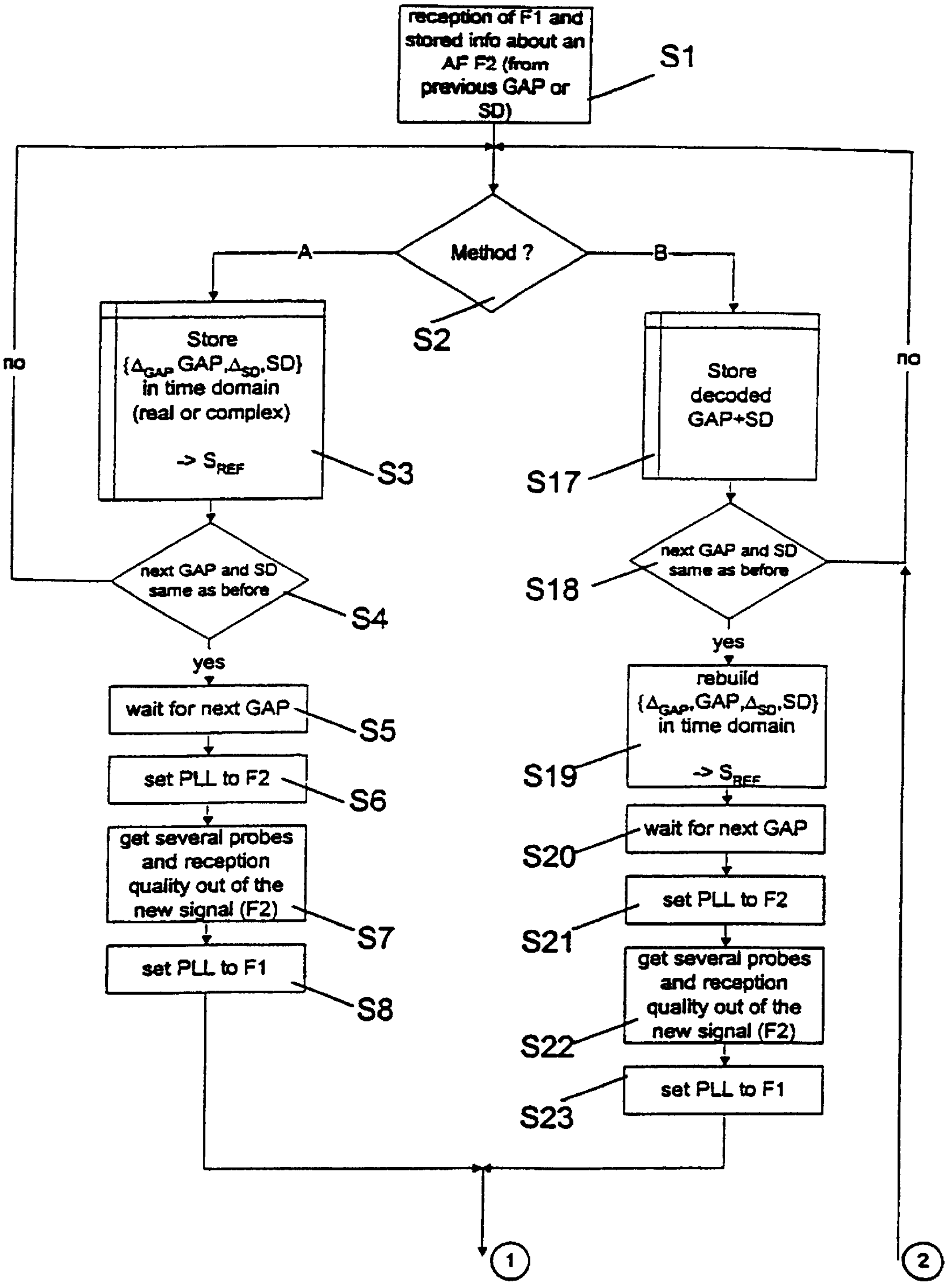
FIG. 3 depicts a flow chart for a seamless alternative frequency switching.
Figure 3B:
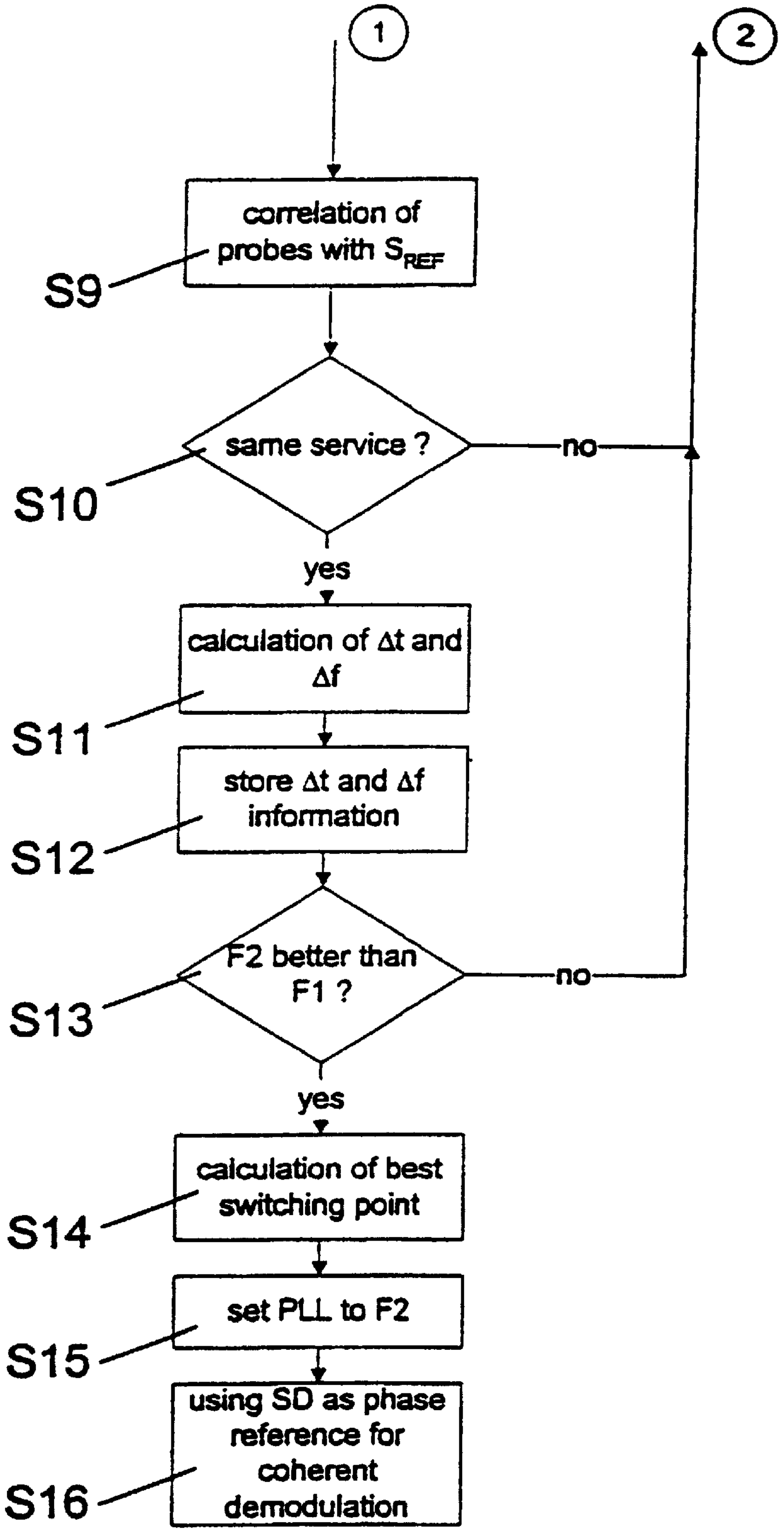
Figure 4:
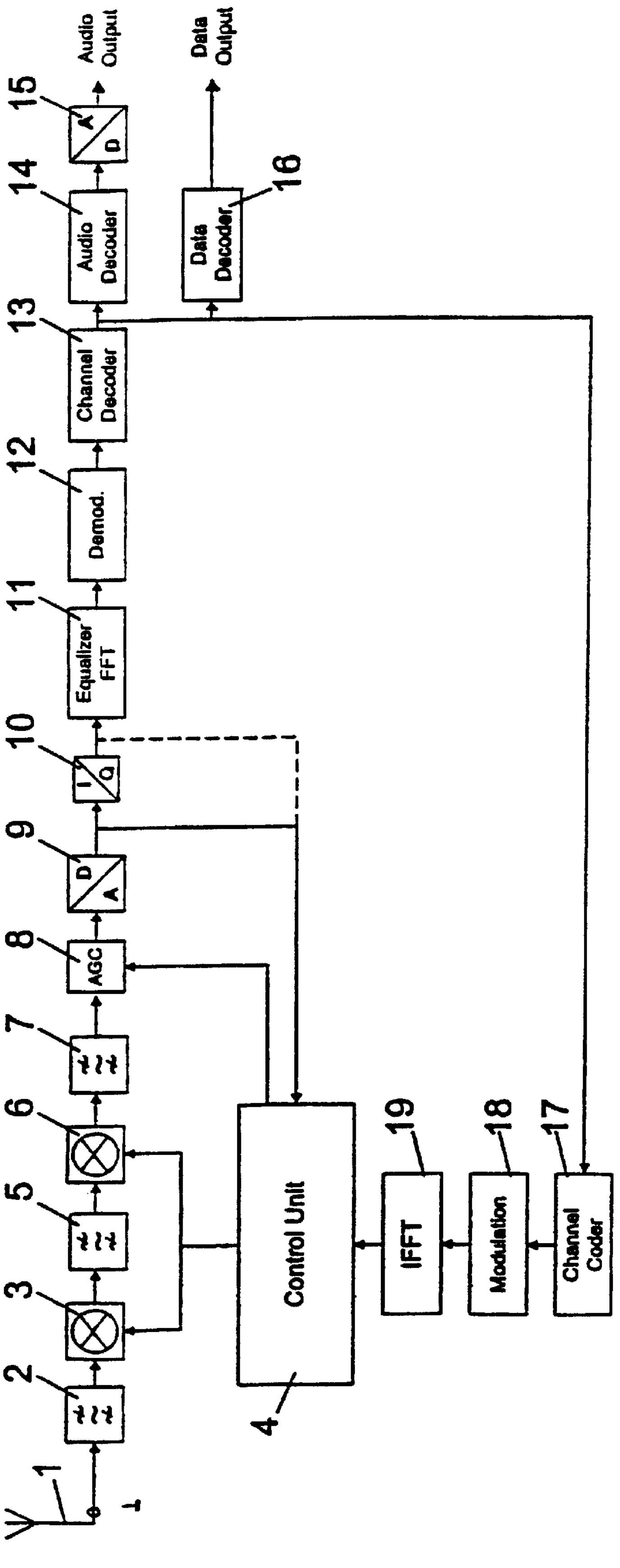
FIG. 4 is a block diagram of a receiver adapted to seamless switching.

FIG. 3 that consists of FIG. 3*a* and FIG. 3*b* which fit together at connection points ① and ② shows a flow chart describing the AF-switching procedure. The receiver is currently tuned to a frequency F1 and has already got the information about the alternative frequency F2, e. g. received in the previous SD and GAP. The flow chart depicts two alternative methods A and B to generate the reference signal $S_{REF}$ $$S_{REF}=\text{time-mux } \{\Delta_{GAP}, \text{GAP}, \Delta_{SD}, \text{SD}\}$$

wherein $\Delta_{GAP}$ is the guardinterval of the gap, $\Delta_{SD}$ is the guardinterval of the static data part and time-mux indicates that the following signal parts are transmitted in time-multiplex.

In a first step S1 the signal transmitted on the frequency F1 is received and the information about an alternative frequency F2, e. g. gathered from a previous SD and GAP, is stored. Thereafter, in a step S2 it is decided whether method A or method B is performed to generate the reference signal $S_{REF}$.

In case method A is performed step S3 is carried out in which the received $\{\Delta_{GAP}$, GAP, $\Delta_{SD}$, SD$\}$ is stored as reference signal $S_{REF}$ in the time domain as real or complex signal. Thereafter, it is checked in step S4 whether the next transmitted SD and GAP is the same as before on basis of the reference signal $S_{REF}$.

The decision whether the next SD and GAP is checked in step S4 depends on the indicator included in the dynamic data part, since this indicator indicates which of the following frames transmits the same SD and GAP as the frame which served as a basis for generation of the reference signal $S_{REF}$.

If the next GAP and SD is not the same as the one on basis of which the reference signal $S_{REF}$ is generated step S2 is again performed. If, on the other hand, it is decided that the next GAP and SD corresponds to the GAP and SD on basis of which the reference signal $S_{REF}$ is generated the receiver waits in step S5 for the next GAP, since this is transmitted before the SD in this embodiment of the present invention. Thereafter, when the beginning of the next GAP is received, the phase locked loop (PLL) of the receiver is set to the frequency F2 in step S6 and at least two signal probes and the reception quality is gained out of the new signal F2 in step S7 before the phase locked loop is again set to the frequency F1 in step S8.

During the following reception of the signal transmitted on the frequency F1 the receiver performs a respective correlation of the at least two sets of samples, i. e. the probes, with the reference signal $S_{REF}$ in step S9 according to the present invention to decide whether the reference signal and the probes belong to the same service or not in step S10. If this is not the case step S2 is again performed, otherwise, i. e. if the reference signal and the probes belong to the same service, the information for time and frequency synchronization to the new frequency F2, namely the time and the frequency deviations Δt and Δf are calculated in step S11 and stored in step S12. In step S13 it is decided whether the frequency F2 has a better signal quality than the frequency F1. If this is not the case step S2 is again performed. If this is the case the best switching point is calculated in step S14 before the phase locked loop of the receiver is set to the frequency F2 at this best switching point in step S15 and the quasi-static data part SD transmitted on the frequency F2 is used as phase reference for the coherent demodulation in step S16.

If it is decided in step S2 that the method B should be performed instead of method A steps S17 to S23 are carried out instead of steps S3 to S8.

Therefore, in step S17 the decoded GAP and SD is stored before it is decided in step S18 whether the next GAP and SD corresponds to the stored ones in step S18. This step S18 directly corresponds to step S4 and therefore depending on the indicator within the dynamic data part also another corresponding GAP and SD could be checked. If no corresponding GAP and SD exists again step S2 is performed (the same situation as in connection with step S4). If, on the 5 other hand, the GAP and SD which has been stored in step S17 will be transmitted again then $\{\Delta_{GAP}$, GAP, $\Delta_{SD}$, SD$\}$ will be rebuild in the time domain and stored as reference signal $S_{REF}$ in step S19. Such a rebuilding might be performed with several different coding techniques, i. e. several different signals $S_{REF}$ might be generated from the same information. Thereafter, the receiver waits for the next GAP in step S20 (corresponding to step S5), sets then the PLL to the frequency F2 in step S21 (corresponding to step S6), gets at least two sets of samples and the reception quality out of the new signal received on the frequency F2 in step S22 (corresponding to step S7) and sets the PLL to the frequency F1 in step S23 (corresponding to step S8) before again proceeding with step S9.

The typical hardware structure of a digital receiver adapted to perform the method according to the invention is shown in FIG. 9. The transmission signal, in particular a Digital Radio Mondial signal, is received by an antenna 1 and after amplification passes a selective pre-stage 2 and is supplied to a first input of a mixer 3 that receives as a second input thereof a frequency control signal supplied by a control unit 4. Following an IF filter stage 5, the resulting signal is supplied to one input of a mixer 6 supplied at its other input thereof a frequency control signal from the control unit 4. The resulting signal is again filtered in IF filter 7 before its level is adjusted in an automatic gain control (AGC) circuit 8 and AD/conversion in an A/D-converter 9. The automatic gain control circuit 8 also receives a control signal from the control unit 4. The digital signal supplied from the A/D-converter 9 undergoes an IQ-generation in an IQ-generator 10 before a FFT is performed in an equalizer 11 and the resulting signal is demodulated by a demodulator 12 and the channels get decoded by a channel decoder 13. The decoded channels are then input to an audio decoder 14 which outputs a digital audio signal that gets converted by a D/A-converter 15 and to a data decoder 16 which outputs digital data. The control unit 4 further receives the amplitude corrected and digitized output signal of the A/D-converter 9 either direct or as IQ-signals from the IQ-generator 10. To be able to rebuild the reference signal $S_{REF}$ the output signal from the channel decoder 13 is also fed through a channel coder 17, a modulator 18 and an IFFT circuit 19 which performs an Inverse Fast Fourier Transformation before being input to the control unit 4.

Of course, the inventive method can be performed with three or more sets of samples to further increase the validation result.

What is claimed is:

1. Method to verify that a service transmitted on an alternative frequency to a currently received frequency is the same as a service transmitted on said currently received frequency, wherein a first correlation result of a first set of samples taken from a signal representing said service transmitted in the alternative frequency at a first point of time with a reference signal indicates whether or not both signals are the same, said method comprising the steps of:

calculating a respective further correlation result of at least one further set of samples taken from the signal transmitted on the alternative frequency at a further point of time that has a respective predetermined time relationship ($\Delta t_{corr}$) to the first point of time with said reference signal, and comparing said first correlation result with said respective fiber correlation result, wherein the comparing result verifies whether or not both services are the same.

2. Method according to claim 1, wherein the step of comparing includes a time comparison of the time ($t_1$) of occurrence of a correlation peak included in the first correlation result with the time ($t_2$) of occurrence of a correlation peak included in the respective further correlation result to check whether the time relationship ($|t_2-t_1|$) between said correlation peaks is the sane as said predetermined time relationship ($\Delta t_{corr}$) of the respective further point of time to the first point of time.

3. Method according to claim 1, wherein said reference signal is a copy of the signal received on the first frequency for which an indicator shows when it will be repeated.

4. Method according to claim 1, wherein said reference signal is a signal which is rebuild in the tine domain on basis of the information carried by the service received on the first frequency for which an indicator shows when it will be repeated.

5. Method according to claim 1, wherein a signal representing a service is a digital short-, medium-, or longwave signal.

* * * * *